3,326,627
DYEING METAL MODIFIED POLYPROPYLENE WITH A THIAZOLOTHIAZOLE AND PRODUCT THEREOF
Hans Dressler, Pitcairn, and Henry W. Pons, Lock Haven, Pa., assignors to American Aniline Products, Inc., a corporation of Delaware
No Drawing. Filed June 22, 1964, Ser. No. 377,066
7 Claims. (Cl. 8—31)

This invention relates to the coloring of polyolefins. In one specific aspect, it relates to the application of a heretofore unrecognized class of colorants to polyolefins, particularly polypropylene, in the form of yarn, fabric, filaments or film.

The polymers made from lower mono-alpha-olefins, particularly polypropylene, are known to have good fiber forming properties. One of the difficulties confronting the textile industry in making new fabrics from these polymers is the problem of coloration. Polypropylene and polyethylene lack the functional groups along the chain of the polymer that tend to permit dyestuffs to be absorbed or otherwise bound firmly by physical or chemical forces.

Considerable research effort has been expended in providing a satisfactory process for dyeing polyolefins. In the recently issued patent to Joseph Bianco et al., U.S. 3,128,146, there is described a method of dyeing polypropylene by immersing the polymer in an emulsified dye liquor at a temperature between 27° C. and the boiling point of the liquor. The dye liquor is prepared by dissolving a water-insoluble, oil-soluble dyestuff in an inert organic solvent. The Bianco process provides colored polyolefins which are surprisingly fast to light, fast to soaping and crocking. Unfortunately, the dry cleaning resistance of the dyed fiber is somewhat limited.

Recently, an effort has been made to provide a polymer of improved dyeability by the incorporation into the polymer of a polyvalent metal, such as nickel, chromium, cobalt, aluminum, titanium or zinc. The preparation of such metal-containing polymers is described in the patent to Caldwell et al., U.S. 2,984,634.

We have discovered that a class of colored compounds not heretofore recognized as dyes for fabrics can be applied to metal-containing polypropylene to give yellow to greenish-yellow dyeings having a tinctorial strength considerably greater than that of many dyes ordinarily recommended for this purpose. The dyeings obtained using our heretofore unrecognized class of colors have excellent wash and dry cleaning fastness and a lightfastness of sixty hours or greater, as determined by accelerated laboratory testing methods.

It is, therefore, an object of the invention to provide a method of dyeing polypropylene with a new class of colored compounds to produce on the dyed polymer intense colors of excellent wash, dry cleaning and lightfastness.

In accordance with the invention, polyvalent metal-containing polypropylene is dyed with a thiazolothiazole of the formula:

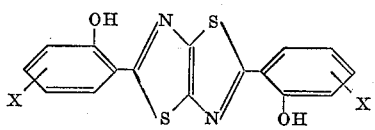

wherein X is a member selected from the group consisting of hydrogen and halogen.

The dyestuffs are conveniently applied to polypropylene from an aqueous bath using a dispersing agent. The polyvalent metal-containing polypropylene is commercially available. Ordinarily, it contains from 0.05 to 2 percent, preferably from 0.05 to 0.2 percent, by weight of nickel, aluminum, cobalt, or chromium, although it can suitably contain any polyvalent metal, as described in the Caldwell et al. patent U.S. 2,894,634.

The colorants used in the invention are easily synthesized by known techniques from salicylaldehyde or halo-substituted salicylaldehyde condensed with dithiooxamide.

Conveniently, the dithiooxamide is mixed with salicylaldehyde in an amount substantially in excess of the theoretical requirement (two moles of salicylaldehyde per mole of dithiooxamide). The mixture is heated to an elevated temperature, preferably the reflux temperature of the reaction mixture, and water is removed therefrom as formed. The mixture is then cooled and the solid product thus formed is separated by filtration, washed with a suitable solvent and thereafter dried.

The halogen-substituted thiazolothiazoles useful in the invention are easily prepared by the foregoing procedure using, for example, 5-chloro- or 5-bromosalicylaldehyde as a starting material. Alternatively, the halogen-substituted compounds can be prepared by the direct halogenation of 2,5 - di - (2-hydroxyphenyl)thiazolo-[5,4-d-]thiazole in a strong mineral acid, such as sulfuric acid.

Dyeing is best accomplished by providing a bath comprising an aqueous dispersion containing the desired dye in a concentration of 0.05 to 2 percent by weight. The dispersion is formed by using from 0.01 to 2 percent by weight of a conventional dispersant or emulsifying agent. Useful emulsifying agents include the alkali metal salts of alkylaryl sulfonates, the salts of sulfate esters of alkylphenoxypolyoxyethylene alkanols, long chain hydrocarbon alkali metal sulfonates, the alkali metal acylalkyl taurates, monoalkyl biphenyl monosulfonate salts, dialkylphenyl phenyl disulfonate salts, polymerized salts of alkylnaphthalenesulfonic acids, alkylsulfate salts, alkylaminealkane sulfonates, polyoxyethylene alkyl ethers and thioethers, fatty alcohol ethylene oxides, polyoxyethylene alkylphenols, alkylphenoxypolyoxyethylene alcohols, polyoxyethylene esters of mixed fatty and rosin acids, and the like. Because of their commercial availability, the alkali metal alkylaryl sulfonates and alkylaminealkane sulfonates are preferred.

If desired, the dye bath can be adjusted to a slightly acid pH (3.5–6) by the addition of a dilute aqueous solution of an organic acid, such as acetic acid or an inorganic acid, such as phosphoric acid. The slightly acid pH assists in the formation of the metal complex on the fiber and in the rapid development of tinctorial strength.

Our invention is further illustrated by the following examples:

Example I.—2,5-di-(2-hydroxyphenyl)thiazolo-[5,4-d-]thiazole

A mixture of 24.4 g. (0.2 m.) of dithiooxamide and 220 g. (2.0 m.) of salicylaldehyde was refluxed under a modified Dean-Stark apparatus for three hours, removing water as formed. The mixture was then cooled to 25° C. and filtered. The solids were washed with ethanol and dried to give 35.5 g. (77 percent yield) of yellow product, M.P. 260–6° C. After recrystallization from chlorobenzene, M.P. 273–5° C.

Example II.—Dyeing of nickel-containing polypropylene

Commercial nickel-containing polypropylene was placed in 100 cc. of an aqueous dispersion containing one percent by weight of 2,5-di-(2-hydroxyphenyl)thiazolo-[5,4-d-]thiazole, prepared as described in Example I. The pH was adjusted to pH 5 by the addition of a one percent solution of acetic acid. The dispersion was maintained using one percent by weight of a commercially available dispersing agent, Nacconol NR, an alkylaryl sulfonate. The resulting bright yellow dyeing exhibited excellent wash fastness and sixty hours lightfastness as measured by a carbon-arc Fade-O-Meter. Dry cleaning fastness was determined by immersing the dyed fiber in perchloroethylene for 36 hours. No color was lost in this test, indicating excellent drycleaning fastness.

*Example III.—Brominated 2,5-di-(2-hydroxyphenyl)-thiazolo-[5,4-d-]thiazole*

A flask was charged with 200 ml. concentrated sulfuric acid and 2.66 g. (0.1 m.) of 2,5-di-(2-hydroxyphenyl)-thiazolo-[5,4-d-]thiazole was added slowly thereto. The mixture was stirred to solution at about 45° C. and 16.0 g. (0.1 m.) bromine was added dropwise over a period of 1.5 hours, and the brominated solid precipitated from the reaction mixture. The mixture was drowned in icewater and filtered and the resulting filter cake was slurried in water. The slurry was neutralized to pH 6.5 with sodium bicarbonate. Filtration and drying gave 46.5 g. of product containing 26.2 percent bromine. (Theory for monobromination, 19.7 percent, dibromination, 33.1 percent.) The product thus obtained was therefore a mixture of mono- and dibrominated thiazolothiazole.

*Example IV.—Dyeing of metal-containing polypropylene*

The procedure of Example II was substantially repeated using the brominated thiazole of Example III. A greenish-yellow dyeing of excellent wash and dry cleaning fastness an acceptable lightfastness was obtained on nickel-containing polypropylene. Substantially identical results are obtained using aluminum-containing polypropylene, chromium-containing polypropylene, cobalt-containing polypropylene and zinc-containing polypropylene.

We claim:

1. A method of dyeing polyvalent metal-containing polypropylene textile and film comprising applying thereto in an amount sufficient to impart color, a compound of the formula:

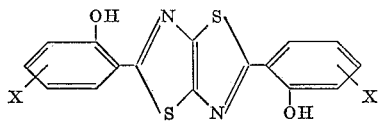

wherein X is a member selected from the group consisting of hydrogen and halogen.

2. A method of dyeing polyvalent metal-containing polypropylene textile and film comprising contacting said polypropylene textile and film with an aqueous dispersion containing 0.05 to 2 percent by weight of a compound of the formula:

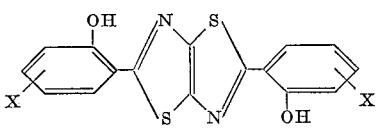

wherein X is a member selected from the group consisting of hydrogen and halogen.

3. Method according to claim 2 wherein the pH of the dispersion is adjusted to pH 3.5–6.

4. Polyvalent metal-containing polypropylene textile and film dyed in an amount sufficient to impart color with a compound of the formula:

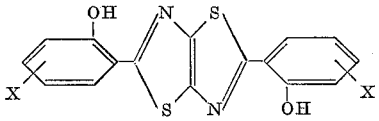

wherein X is a member selected from the group consisting of hydrogen and halogen.

5. Nickel-containing polypropylene textile and film dyed with a compound of the formula:

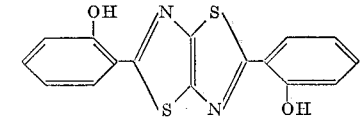

6. Nickel-containing polypropylene textile and film dyed with a compound of the formula:

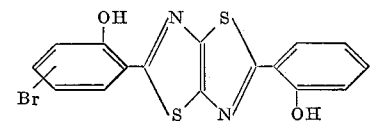

7. Nickel-containing polypropylene textile and film dyed with a compound of the formula:

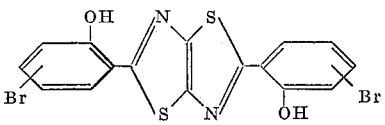

No references cited.

NORMAN G. TORCHIN, *Primary Examiner.*

D. LEVY, *Assistant Examiner.*